Nov. 8, 1938.    W. E. SLOAN    2,136,221
FLUSH VALVE
Filed July 13, 1934

Inventor
William E. Sloan
By Parker & Carter
Attys.

Patented Nov. 8, 1938

2,136,221

UNITED STATES PATENT OFFICE 2,136,221

FLUSH VALVE

William E. Sloan, Chicago, Ill., assignor to Sloan Valve Company, Chicago, Ill., a corporation of Illinois Application July 13, 1934, Serial No. 734,899

12 Claims. (Cl. 137—93)

This invention relates to flush valves and has for its object to provide a new and improved device of this description. The invention has as a further object to provide a flush valve with positive means for centralizing the relief valve. The invention has as a further object to provide means for insuring the lifting of the main valve, even where there are extremely low pressures of the water in the system where the valve is used. The invention has as a further object to provide a flush valve having a leather diaphragm substituted for the usual cup leather piston construction. The invention has other objects which are more particularly pointed out in the accompanying description.

Referring now to the drawing.

Like numerals refer to like parts throughout the several figures.

Figure 1:
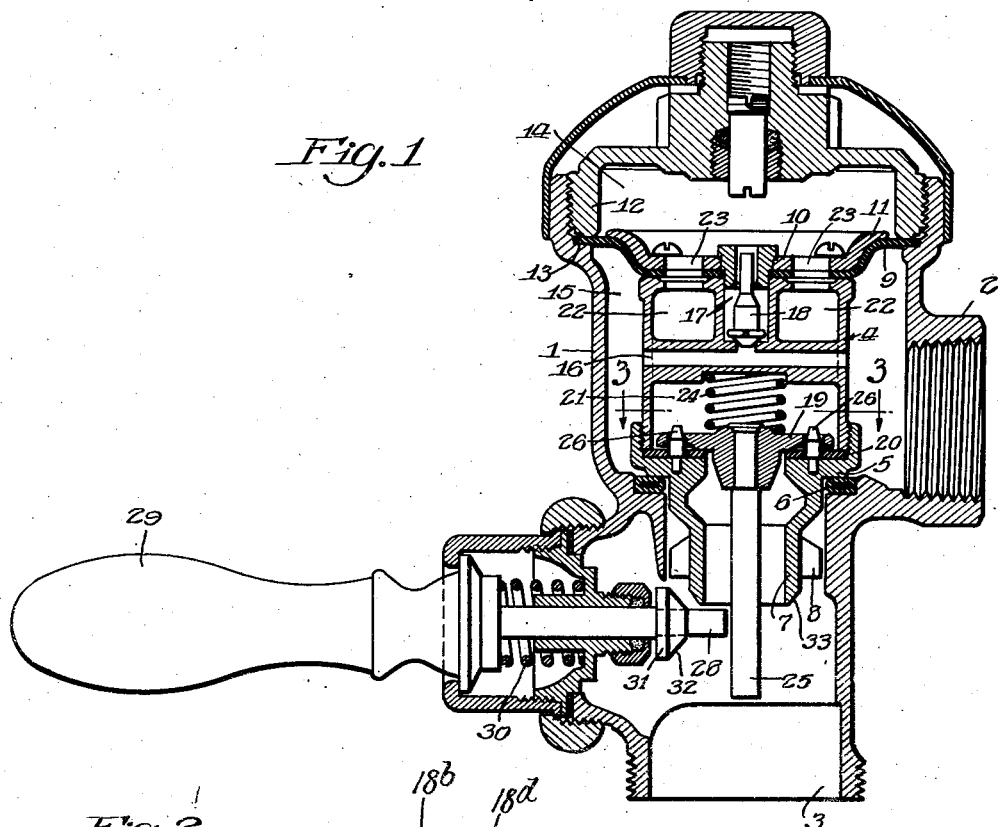
Fig. 1 is a sectional view through one form of valve embodying the invention.

Referring to the drawing, I have shown a valve casing 1 having a connection 2 by means of which it is connected to a source of water supply and a discharge 3 through which the water is discharged. Located within the casing is a main valve 4 which has a seating portion 5 which seats on the seat 6. The main valve is provided with a depending part 7 which, when the valve is closed, projects below the seat 6 and which preferably has wings 8 for guiding it.

The main valve 4 has connected therewith a leather diaphragm 9 which is clamped to the body of the valve by means of the clamping member 10. This clamping member has a curved outer edge 11 against which the leather diaphragm 9 is pressed when the valve is closed. This diaphragm 9 is fastened in position by means of the top piece 12 which has the screw threaded connection with the upper end of the casing 1, the diaphragm being pressed between the top piece 12 and the annular shoulder 13 on the casing.

The diaphragm 9 divides the casing into two chambers, the upper chamber 14 and a lower chamber 15. A bypass connects the lower chamber 15 with the upper chamber 14, the bypass consisting of the passageway 16 which communicates with the chamber 15 and which connects, near its middle, with the passageway 17 leading to the chamber 14.

Within the bypass passageway 17 is a bypass controlling member 18 arranged to close the bypass except for a small opening formed by a groove 18a. This groove may be in the bypass controller or in the face of the part 18b which is engaged by the beveled face 18d of the bypass controller. I have shown this groove as being in the part 18b. When the auxiliary valve is opened, as hereinafter set out, and the main valve has been opened and is on its way to its seat, the bypass controller is lifted to the position shown in Fig. 2 so as to close the bypass except for the small groove 18a, and thus delay the flow of the water into the chamber 14 and the seating of the valve so as to insure a proper amount of water passing through the valve.

The main valve 4 is hollow and contains an auxiliary valve 19. This auxiliary valve seats on a seat 20 in the main valve and normally closes the communication between the upper chamber 14 and the discharge 3. The chamber 21 in the main valve, in which the auxiliary valve 19 is located, communicates with the chamber 14 through the chambers 22 and the openings 23. The member 16a in which the bypass passageway 16 is located, does not extend entirely across the main valve in a direction at right angles to that shown in Fig. 1, so that there is communication on each side thereof between the chamber 21 and the chambers 22.

A spring 24 on the top of the auxiliary valve engages a fixed part of the main valve so as to insure the proper closing of the auxiliary valve. The auxiliary valve is provided with a stem 25 which projects downwardly therefrom. Means are provided for centralizing this auxiliary valve. As herein shown, this means consists of a plurality of pins or projections 26 projecting above the seat 20 of the auxiliary valve and passing through openings 27 therein. When the stem 25 of the auxiliary valve is moved to one side, this valve is tilted, as shown for example in Fig. 2, and this permits water to escape from the chamber 14 down through the openings 23 and chambers 22 and 21 and past the auxiliary valve out through the discharge opening 3, thus relieving the pressure in the chamber 14. The pressure in the chamber 15, if sufficient, will lift the main valve through the agency of the diaphragm so as to open this main valve. If the pressure is low in the system, or if for any reason the difference in pressure between chamber 14 and chamber 15 is not sufficient to start the upward movement of the main valve, this main valve may be started by a positive starting means. As herein shown, the stem 25 is actuated by an actuating member 28 which is moved toward the valve stem by means of a handle 29. When this handle is moved in any direction it moves the actuating member 28 inwardly and this member is moved outwardly when the handle is released by the retracting spring 30.

The actuating member 28 is provided with a starting member 31, which in this instance is fixed thereto and which has a beveled face 32 which engages a beveled face 33 on the projection 7 connected with the main valve. When the handle is moved the actuating member 28 is moved inwardly toward the valve stem 25 and the beveled face 32 of the starting member engages the beveled face 33 on the projection 7, and the pressure applied to the handle is exerted through these beveled faces to lift the main valve from its seat, as clearly shown in Fig. 2, thus starting the upward movement of the main valve. The pressure of the water in chamber 15 will then complete the upward movement of the main valve. It will thus be seen that when the pressure in the water system is not sufficient to start the main valve, the starting element will start it when the handle is pushed so as to insure the proper operation of the valve under conditions where it would not properly operate without this starting element. This starting element, therefore, is an important factor in this valve.

Figure 2:
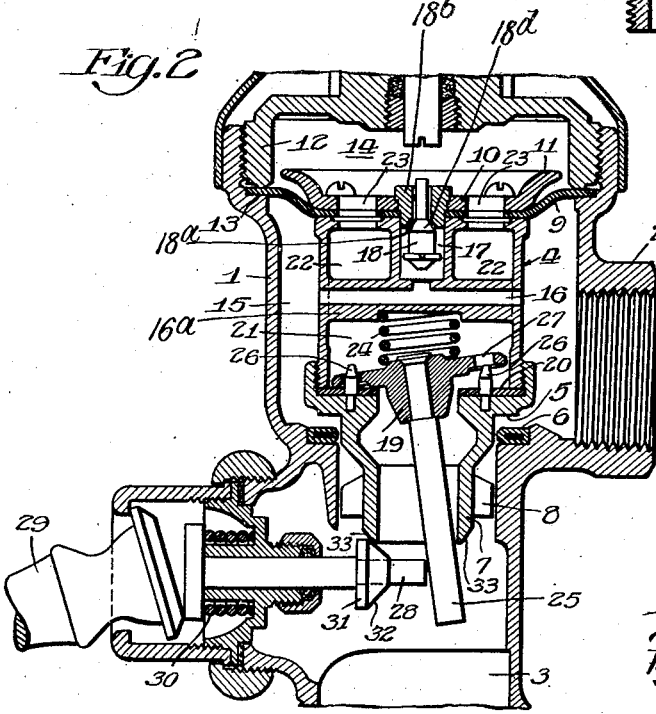
Fig. 2 is a similar view to Fig. 1 showing the handle moved to the operating position.
Figure 3:
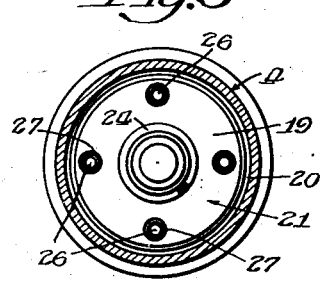
Fig. 3 is a sectional view taken on line 3—3 of Fig. 1.

When the handle is moved to move the stem 25 of the auxiliary valve to one side, as shown in Fig. 2, to open the auxiliary valve, the valve is tilted as shown in that figure and the centering elements 26, cooperating with the auxiliary valve, insures the proper centering of this valve when the actuating member is disengaged therefrom and the valve stem 25. These centering elements are preferably arranged with beveled upper ends so that it will be properly received in the openings 27 when the auxiliary valve is returned to its closed position. These pins are also important factors in the tilting of the auxiliary valve. When the auxiliary valve is tilted, one or two of these pins act as pivots about which the valve is tilted, the valve being maintained against lateral movement and out of contact with the inner face of the hollow valve. It will be seen that there is therefore very little friction when the valve is tilted and when it is moved back to its initial position, the valve being held out of contact at all times with the inner face of the hollow main valve.

I have described in detail a particular construction embodying the invention, but it is of course evident that the parts may be varied in many particulars without departing from the spirit of the invention as embodied in the claims hereto appended, and I therefore do not limit myself to the particular construction shown.

I claim:

1. A flush valve comprising a casing, a main valve therein which divides the casing into two chambers, an upper chamber and a lower chamber, a bypass connecting the two chambers, a passageway leading from the upper chamber through the main valve, a tilting auxiliary valve controlling said passageway, a laterally sliding actuating member for said auxiliary valve said actuating member being separate from the valve, said actuating member having a part which engages the main valve and lifts it from its seat when the actuating member is moved to actuate the auxiliary valve.

2. A flush valve comprising a casing, a main valve therein which divides the casing into two chambers, an upper chamber and a lower chamber, a bypass connecting the two chambers, a passageway leading from the upper chamber through the main valve, an auxiliary valve controlling said passageway, a stem for said auxiliary valve, means for imparting a thrust at substantially right angles to said stem to tilt said auxiliary valve to open it, and a plurality of centering devices fixed to said main valve located intermediate the center and the periphery of the auxiliary valve and in substantial horizontal alignment and engaging said auxiliary valve to properly center it when it moves to its closed position, said centering devices having sufficient looseness to permit said valve to tilt at least five degrees to open said passageway.

3. A flush valve comprising a casing, a main valve therein which divides the casing into two chambers, an upper chamber and a lower chamber, a bypass connecting the two chambers, a passageway leading from the upper chamber through the main valve, an auxiliary valve controlling said passageway, and a plurality of centering devices connected with said main valve and engaging said auxiliary valve to properly center it when it moves to its closed position, said centering devices comprising pins which project through openings in the auxiliary valve, said pins being tapered at their free ends to permit said valve to tilt to open the passageway.

4. A flush valve comprising a casing, a main valve therein which divides the casing into two chambers, an upper chamber and a lower chamber, a bypass connecting the two chambers, a passageway leading from the upper chamber through the main valve, an auxiliary valve controlling said passageway, and a plurality of centering devices connected with said main valve and engaging said auxiliary valve to properly center it when it moves to its closed position, said centering devices comprising pins which project through openings in the auxiliary valve, said pins being beveled at their tops.

5. A flush valve comprising a casing, a main valve therein which divides the casing into two chambers, an upper chamber and a lower chamber, a bypass connecting the two chambers, a passageway leading from the upper chamber through the main valve, an auxiliary valve controlling said passageway, an actuating member for said auxiliary valve, and laterally moving means adapted to engage both the main valve and the auxiliary valve and controlled from the exterior of the valve casing for moving both the auxiliary valve and the main valve from their seats, said laterally moving means being reciprocable at substantially right angles to the axis of the main valve to effect said engagement.

6. A flush valve comprising a casing, a main valve therein which divides the casing into two chambers, an upper chamber and a lower chamber, a bypass connecting the two chambers, a passageway leading from the upper chamber through the main valve, a tilting auxiliary valve controlling said passageway, a stem therefor, a laterally sliding actuating member for engaging the stem of said tilting auxiliary valve, and means independent of the water pressure for starting the opening movement of said main valve when the auxiliary valve is actuated comprising a starting member on said sliding actuating member having a beveled face which engages said main valve.

7. A flush valve comprising a casing, a main valve therein, an auxiliary tilting valve carried by the main valve, a series of pins spaced apart connected with the main valve and projecting through openings in the auxiliary valve, and means for tilting said auxiliary valve so as to move one edge of it with relation to the pins associated with such edge.

8. A flush valve comprising a casing, a main valve therein, an auxiliary tilting valve carried by the main valve, a series of pins spaced apart connected with the main valve and projecting through openings in the auxiliary valve, and means for tilting said valve about certain of said pins as a pivotal point.

9. A flush valve comprising a casing, a main valve therein, an auxiliary tilting valve carried by the main valve, an opening controlled by said auxiliary tilting valve, and means within the periphery of said auxiliary valve for holding said tilting valve against lateral movement while it is being tilted, said means comprising separated pins projecting through openings in the auxiliary valve.

10. In combination, an auxiliary valve for controlling the operation of the main valve of a flush valve including a seat member having a passageway therethrough, a valve member larger in diameter than said passageway movable into and out of seating engagement with said seat member to close and open said passageway, guide pins affixed to one of said members between the periphery of said passageway and the periphery of said valve member, the other member being constructed so as to cooperate with the guide pins in guiding the movable member to and from its seat while permitting the valve member to be tilted through an angle of several degrees to control the passageway, a stem fixed to said valve member, and means for imparting a side thrust to said stem for tilting said valve member to open it, while said pins maintain the valve member in position against the said side thrust.

11. In combination, an auxiliary valve for controlling the operation of the main valve of a flush valve including a seat member having a passageway therethrough, a valve member larger in diameter than said passageway movable into and out of seating engagement with said seat member to close and open said passageway, guide pins affixed to one of said members between the periphery of said passageway and the periphery of said valve member, the other member being provided with openings cooperating with guide pins in guiding the movable member to and from its seat while permitting tilting of the valve member through an angle of several degrees, a stem fixed to said valve member, and means for imparting a side thrust to said stem for tilting said valve member to open it, while said pins maintain the valve member in position against the said side thrust.

12. In an auxiliary valve for controlling the operation of the main valve of a flush valve, a seat member having a passageway therethrough, a valve member larger in diameter than said passageway tiltably movable out of and into seating engagement with said seat member to open and close said passageway, the said members being of such configuration that the fulcrum point about which the valve member is tilted lies between the center and the periphery of the valve member, and guiding means located outside of the fulcrum point and within the periphery of the valve member for preventing the valve member from sliding out of position.

WILLIAM E. SLOAN.